March 28, 1961     R. J. HABER     2,977,075
AIRCRAFT ARRESTING MEANS
Filed July 10, 1958     2 Sheets-Sheet 1
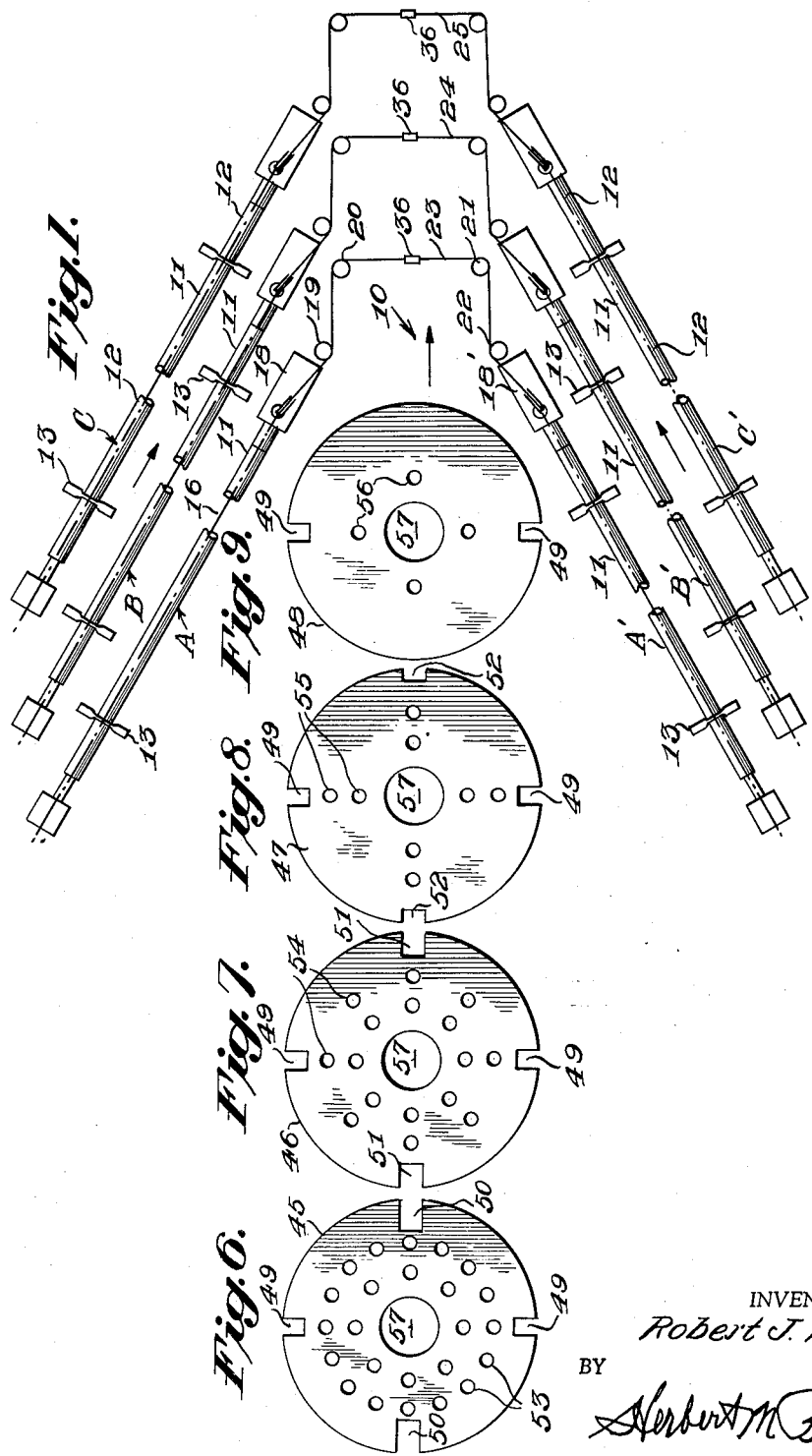
INVENTOR.
Robert J. Haber
BY
Herbert M. Birch

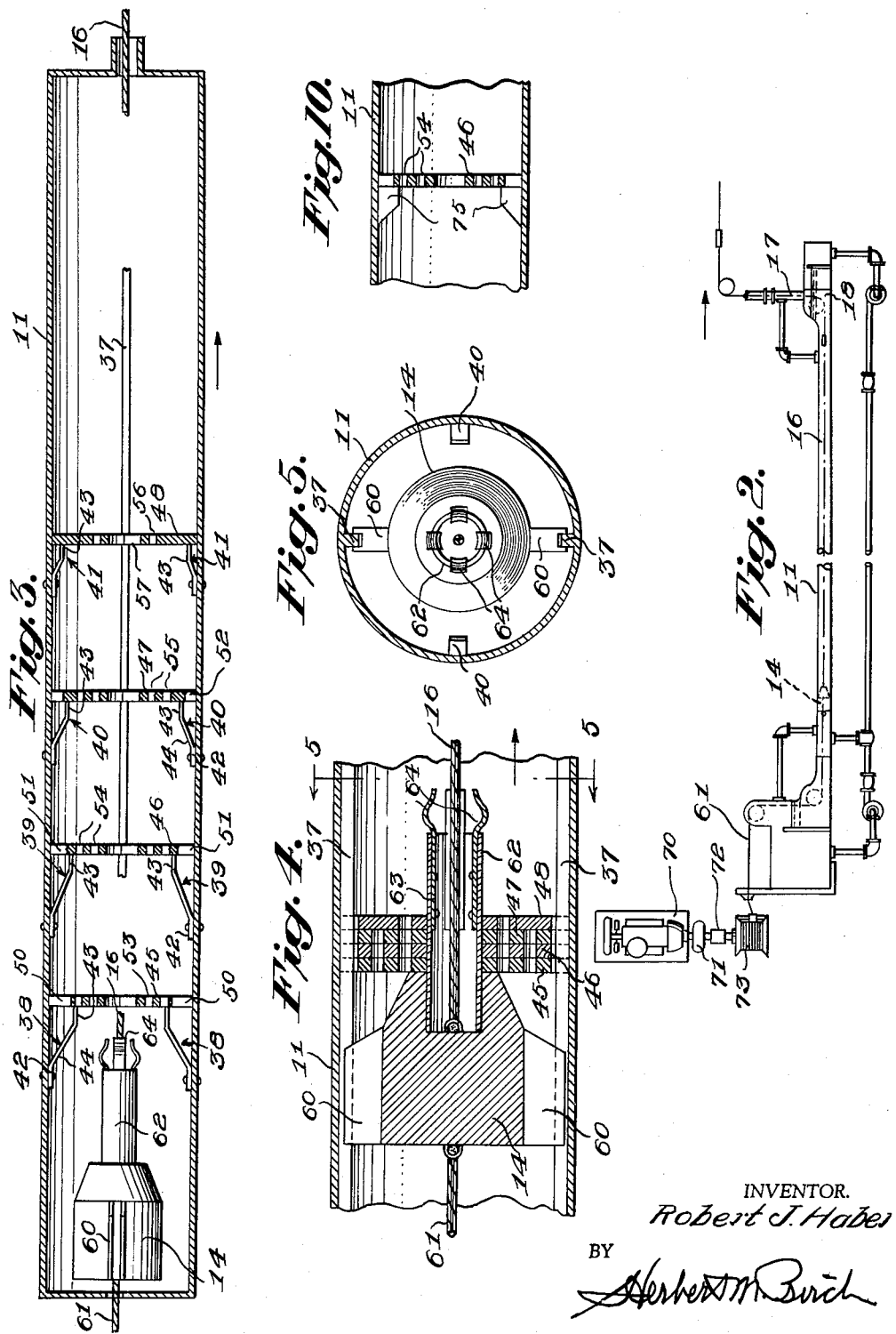

United States Patent Office 2,977,075
Patented Mar. 28, 1961

2,977,075

AIRCRAFT ARRESTING MEANS

Robert J. Haber, Graylyn Crest, Del., assignor to All American Engineering Company, Wilmington, Del., a corporation of Delaware Filed July 10, 1958, Ser. No. 747,707

2 Claims. (Cl. 244—110)

The present invention relates to aircraft arresting means and same is related to prior co-pending application Serial No. 300,014, filed July 21, 1952, and now Patent Number 2,731,219, in the name of Robert B. Cotton and Donald B. Doolittle, and the present application is a continuation-in-part of co-pending application Serial No. 526,498 and now Patent Number 2,936,977, in the name of Raymond M. Ballard et al.

The general object of the present invention is to provide an aircraft arresting means incorporating a fluid loaded cylinder with the fluid therein being stationary, or non-circulated, and drag means connected to an arresting cable or deck pendant engageable by an aircraft carried arresting hook.

A further object of the invention is to provide a fluid arresting system for aircraft comprising progressively variable resistance means in the fluid loaded cylinder, the progression developing as said means is dragged through the stationary fluid.

A still further object of the invention is to provide an arresting engine with a reduced moving mass, as compared to other arresting engines, which will reduce the initial cable load caused by acceleration of the moving mass of the arresting means, thus providing satisfactory performance at higher airplane engaging speeds.

A still further object of the invention is to provide an arresting means of relatively few parts, thereby making the same easy to assemble, and transport, and which is durable and highly efficient in operation.

With the foregoing and other objects in view, the present invention consists of certain novel features of construction, and combination and arrangement of parts, as will now be more fully described and particularly defined in the appended claims.

In the drawings, wherein like parts are designated by like reference numerals and are thus identified throughout the following description:

Fig. 1 is a general top plan view of a landing runway with some of the present novel spaced pairs of units mounted adjacent thereto for operation.

Fig. 2 is a foreshortened assembled elevational view of one form of one of the complete arresting units shown in Fig. 1.

Fig. 3 is a longitudinal vertical sectional view of the arresting means in each of said arresting units, with certain portions broken away.

Fig. 4 is a fragmental longitudinal sectional view of a fluid cylinder embodied in each of arresting units and a portion of the arresting means disposed therein.

Fig. 5 is a transverse vertical sectional view as observed in the plane of line 5—5 on Fig. 4 with the discs omitted.

Fig. 6 is a front view of one of the discs embodied in the arresting means.

Fig. 7 is a similar view of a second one of the discs embodied in the arresting means.

Fig. 8 is a similar view of a third disc embodied in the arresting means.

Fig. 9 is a similar view of a fourth disc embodied in the arresting means, and

Fig. 10 is a fragmental longitudinal vertical sectional view of a modified embodiment of the invention.

Referring to the drawings in detail, and first with particular reference to Fig. 1, there is disclosed any suitable runway 10, such as for example, a ground strip, a mat, a landing deck or the like, with opposed sets or pairs of arresting units arranged along each side of the runway 10 in a predetermined spaced relation. In this view, there are disclosed three oppositely positioned units A—A,' B—B' and C—C'. All of the units in both sets are of identical construction and units A, B and C are arranged on the left side of the runway when facing in the direction of arrest thereby, as indicated by the directional arrows in Figures 1, 2 and 3, while units A', B' and C' are on the right side and accordingly a detailed description of one of the units would appear to be sufficient.

Each of the said units comprises an elongated housing 11, such as a tube or cylinder in flanged sections 12 bolted together through their respective adjacent flanges 13. Within the housing is an arresting means, such as a piston 14 of relatively smaller outer diameter than the inner diameter of the housing 11.

The piston 14 is connected to an arrest cable 16 and the cable extends from the piston throughout the length of the housing and through an aperture 17 in the housing end cap or sump 18 (Fig. 2).

The cable 16 leads off from the cap 18 of unit A, for example, and reeves around pulleys or sheaves 19, 20, 21 and 22 so as to extend across the runway 10 and through the cap 18' of unit A' into coupling engagement with the piston 14' in the companion housing 11'. Thus the cross strand 23 of cable 16 provides an arrest pendant for engagement by the conventional arrest gear carried by a landing aircraft. When such arrest engagement ocurs, the pendant strand section 23 of the arrest cable 16 is pulled forward by the aircraft and an equalized pull is transmitted to the companion pistons 14 and 14' of the oppositely positioned companion units A and A'.

Each pendant strand 23, 24 and 25 of each set of units A—A', B—B' and C—C' are formed with a separable connection 36, whereby each strand may be parted to unharness and maintain any one of the respective units idle or to provide for harnessing two or more sets of units when desired to permit efficient arrest of greater weights. For example, A and A' alone are efficient up to 6,000 pounds; A and A' together with B and B' up to 12,000 pounds, and A and A' together with B and B' and C and C' up to 18,000 pounds.

While the above described arrest unit arrangement is disclosed and claimed in said co-pending application, Serial No. 526,498, and now Patent Number 2,936,977, the present invention is more particularly concerned with a highly efficient arrest engine disposed within each of the housings 11 and the structure thereof is disclosed in detail in Figs. 3 to 9 inclusive.

Referring now to these figures, it will be observed that each cylindrical housing 11 is provided with diametrically opposed tracks 37 which extend substantially throughout the length of the housing. The tracks, as shown, are substantially of rectangular form in cross section and are suitably secured to the inner cylindrical wall of the housing.

Each housing is further provided with longitudinally spaced pairs of spring catches 38, 39, 40 and 41 which are disposed in axial planes at right angles to the central plane of the tracks 37, as is clearly indicated in Fig. 5. The spring catches are of angular formation and each includes a leg 42 rigidly secured to the wall of the housing 11, a second leg 43 parallel with the first leg 42 and spaced therefrom inwardly of the housing and which legs are interconnected by a leg 44 disposed in acute angular relation to the axis of the housing.

For a purpose later to appear, the legs 43 of the successive catches 38 to 41 are disposed nearer the wall of the housing 11, as is clearly indicated in Fig. 3.

The arrest engine comprises a plurality of normally axially spaced discs 45, 46, 47 and 48 which discs are more clearly indicated in Figs. 6 to 9 inclusive and which normally engage the successive spring catches 38 to 41 inclusive, as is indicated in Fig. 3.

The discs are each provided with a pair of diametrically opposed rectangular slots 49 extending inwardly from the periphery thereof and which slots are all of the same dimensions and which are adapted to receive the diametrically opposed tracks 37 whereby the discs are confined to axial movement only and restrained against rotation.

The discs 45, 46 and 47 are each further provided with a pair of rectangular slots 50, 51 and 52 extending inwardly from the periphery thereof and which are in right angular relation to the slots 49.

As is clearly indicated in Figs. 6, 7 and 8, the slots 50, 51 and 52 are of successively less depth for a reason later to appear and the disc 48 is not provided with corresponding slots.

While the structure is illustratively disclosed as having four discs, it may have a greater or smaller number thereof with the first piston engaged disc having relatively deep slots 50 and the following successive discs having corresponding slots of successively less depth with the last disc having no such slots.

The disc 45 is provided with a relatively large number of apertures 53 which are disposed concentrically of the axis thereof; the disc 46 is provided with a less number of apertures 54 disposed in concentric relation to the axis thereof; the disc 47 is provided with a still less number of apertures 55 disposed concentrically of the axis thereof, and the disc 48 is provided with a still less number of apertures 56 disposed concentrically of the axis thereof.

The apertures in all of the discs are so disposed that those in disc 46 align with a corresponding number of apertures in disc 45, the apertures in disc 47 align with a corresponding number of apertures in disc 46 and the apertures in disc 48 align with a corresponding number of apertures in disc 47.

The discs 45 to 48 inclusive are each further provided with a central circular opening 57 which openings are of uniform diameter.

The discs 45 to 48 inclusive are normally positioned as indicated in Fig. 3 with same in successive engagement with the legs 43 of the spring catches 38 to 41 and with the legs 43 engaging the discs inwardly of the respective slots 50, 51 and 52 therein and the discs are longitudinally slidable within the housing 11 through engagement of the tracks 37 within the slots 49.

The piston 14 is provided with a pair of diametrically opposed guide members 60 which engage the tracks 37, as is more clearly indicated in Fig. 5 and one end of a retrieving cable 61 is connected to the piston.

The piston 14 is further provided with a tube 62 to whose inner wall are secured the shanks 63 of spring clips 64 which, as indicated in Fig. 4, project outwardly of one end of the tube in the direction of arrest movement of the piston and, as is indicated in Fig. 4, the major portion of the tube extends beyond the forward end of the piston.

As is further indicated in Fig. 4, the arrest cable 16 has its piston connected end portion disposed concentrically within the tube 62.

In Fig. 10 is disclosed a modified embodiment of the disc catches which are in the form of solid blocks 75.

Operation of the arresting means is as follows:

First, an aircraft touches down on the runway 10 and picks up either one or all of the deck pendants 23, 24 or 25. This results in a pull on the arresting cable 16 disposed within one or more of the housings 11 disposed on each side of the runway. As each piston 14 moves forward toward the arrest end of the respective housing the spring clips 64 pass into the central opening 57 in the first disc 45 and continued movement of the piston moves the disc 45 on the tracks 37 toward the arrest end of the housing and into contact with the second disc 46 which with the first disc are moved forwardly and the second disc 46 is brought into contact with the third disc 47 which thereafter is brought into contact with the fourth disc 48 whereby the four discs are in stacked face to face relation and due to increased resistance in forward movement of the piston in the stacking of the discs, the discs are moved over the spring clips 64 with the first disc engaging the piston 14, as is indicated in Fig. 4. At this point, it is to be observed that slots 50 in disc 45 clear the spring catches 39, slots 51 in disc 46 clear the spring catches 40, and slots 52 in disc 47 clear the spring catches 41 in the said stacking of the discs.

Upon the piston engaging the first disc 45, substantial resistance will be offered in the arrest movement of cable 16 due to the confinement of the passage of fluid through the plurality of relative small apertures 53.

Upon engagement of disc 45 with disc 46 the passage of fluid will be restricted to the number of apertures 54 in the disc 46 which register with corresponding apertures in the disc 45, whose remaining apertures are blocked off by the disc 46.

Upon engagement of disc 46 with disc 47 with disc 45 in contact with disc 46, the passage of fluid will be restricted to the number of apertures in the disc 47 whose remaining apertures are sealed off by the disc 46 and upon engagement of disc 47 with disc 48, the passage of fluid will be restricted to the relatively small number of apertures in disc 48.

From the above, it will be apparent that upon arresting movement of cable 16, the successive apertured discs will provide increased resistance in the arresting movement of an aircraft.

After an arrest has been made, it is desirable to retrieve the arrest pistons 14 and return same to battery position.

To accomplish this, the engine 70 is started and through the torque converter 71 and the friction clutch 72 a suitable driving rotation is imparted to the retrieving drum 73, shown in Fig. 2. Around the retrieving drum 73 is wound the above referred to retrieving cable 61 which connects to the retrieving side of piston 14.

Upon retrieving the piston 14 from the position shown in Fig. 4 to that in Fig. 3, the discs 45, 46 and 47 will all pass the spring catches 41 due to the slots 50, 51 and 52 therein being of greater depth than the distance of the legs 43 of spring catches 41 from the wall of housing 11 and disc 48 will engage the catches 41; disc 47 will engage catches 40, disc 46 will engage catches 39 and disc 45 will engage catches 38 with a restoration of the discs to normal position as in Fig. 3.

It is to be observed that resistance of the catches to movement of the successive discs will cause same to be withdrawn from the piston carried spring clips 64.

Having set forth the invention in accordance with a preferred structural embodiment thereof, what is claimed and desired to be secured by U.S. Letters Patent is—

1. An arresting means for aircraft comprising pairs of arresting units including an elongated housing filled with static fluid and having a front end and a rear end, a piston having a front end and a rear end movably supported in said housing and being normally disposed adjacent the rear end thereof, an arresting cable having one end thereof connected to said piston and extending through and from the front end of said housing across a landing surface for engagement by an aircraft, a plurality of perforated discs normally disposed in axial spaced relation in said housing between the front end thereof and said piston said discs each having varying quantities of perforations therein, and means cooperating with said housing and said discs for restraining the latter against movement from said axial spaced relation toward the rear end of said housing while permitting movement of the successive discs toward the front end of the housing upon engagement of the innermost disc by the front end of said piston, and the successive engagement of the discs for effecting successively increased resistance to movement of the piston in an arresting operation and means for retrieving said piston to the rear end of said housing, said means being connected to the rear end of said piston.

2. An arresting means for aircraft comprising pairs of arresting units including an elongated housing filled with static fluid and having a front end and a rear end, a piston movably supported in said housing and being normally disposed adjacent the rear end thereof, an arresting cable having one end thereof connected to said piston and extending through and from the front end of said housing across a landing surface for engagement by an aircraft, a plurality of perforated discs normally disposed in axial spaced relation in said housing between the front end thereof and said piston said discs each having varying quantities of perforations therein, means cooperating with said housing and said discs for restraining the latter against movement from said axial spaced relation toward the rear end of said housing while permitting movement of the successive discs toward the front end of the housing upon engagement of the innermost disc by said piston, the successive engagement of the discs for effecting successively increased resistance to movement of the piston in an arresting operation, said discs being provided with uniform diameter center apertures, and said piston being provided with a tube extending forwardly thereof for reception within the said apertures upon engagement of said discs, and a plurality of disc retaining spring clips supported by said tube.

References Cited in the file of this patent

UNITED STATES PATENTS

| 1,282,712 | Barrell | Oct. 22, 1918 |
| 2,814,365 | Snow | Nov. 26, 1957 |

FOREIGN PATENTS

| 1,151,298 | France | Aug. 19, 1957 |